(12) United States Patent
Clout et al.

(10) Patent No.: US 10,537,009 B2
(45) Date of Patent: Jan. 14, 2020

(54) LIGHTING DEVICE WITH CONTEXT BASED LIGHT OUTPUT

(71) Applicant: PHILIPS LIGHTING HOLDING B.V., Eindhoven (NL)

(72) Inventors: Ramon Antoine Wiro Clout, Eindhoven (NL); Dzmitry Viktorovich Aliakseyeu, Eindhoven (NL); Tim Dekker, Eindhoven (NL); Philip Steven Newton, Waalre (NL); Dirk Valentinus René Engelen, Heusden-Zolder (BE); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/749,389

(22) PCT Filed: Jul. 6, 2016

(86) PCT No.: PCT/EP2016/065998
§ 371 (c)(1),
(2) Date: Jan. 31, 2018

(87) PCT Pub. No.: WO2017/021088
PCT Pub. Date: Feb. 9, 2017

(65) Prior Publication Data
US 2018/0220511 A1    Aug. 2, 2018

(30) Foreign Application Priority Data
Jul. 31, 2015    (EP) ..................................... 15179386

(51) Int. Cl.
*G05F 1/00*    (2006.01)
*H05B 37/02*    (2006.01)
*F21V 23/04*    (2006.01)

(52) U.S. Cl.
CPC ..... *H05B 37/0227* (2013.01); *F21V 23/0471* (2013.01); *H05B 37/0218* (2013.01)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS 6,188,325 B1 * 2/2001 Vogel ..................... G08C 17/02
340/12.5
6,476,727 B1 * 11/2002 Vogel ..................... G08C 17/00
340/12.53
(Continued)

FOREIGN PATENT DOCUMENTS

CN    101699923 A    4/2010
CN    103929856 A    7/2014
(Continued)

OTHER PUBLICATIONS

Nesrine Khabou et al., "A Threshold Based Context Change Detection in Pervasive Environments: Application to a Smart Campus," HAL Archives-Ouvertes.FR, HAL ID: HAL-01088780, https://hal.archives-ouvertes.fr/hal-01088780, Nov. 2014 (10 pages).

*Primary Examiner* — Minh D A
(74) *Attorney, Agent, or Firm* — Akarsh Belagodu (57) ABSTRACT

A lighting device (100) arranged for rendering a light output is disclosed. The lighting device (100) comprises at least one light source (102) arranged for emitting light. The lighting device (100) further comprises a receiver (104) arranged for receiving at least one signal from at least one further device (110), which at least one signal is representative of a current location of the lighting device (100). The lighting device (100) further comprises a processor 106 arranged for controlling the light output of the at least one light source (102). The processor (106) is further arranged for determining the current location of the lighting device (100) based on the received at least one signal and for accessing a memory (108) storing associations between locations and light set- (Continued)

tings. The processor (106) is further arranged for comparing the current location to at least one stored location so as to determine whether a first similarity criterion is met, and for controlling, if the first similarity criterion is met, the light output of the lighting device (100) according to a light setting associated with the stored location. This allows a user to move the lighting device (100) between locations, and for each location the previously set light setting associated with that location may be applied to the lighting device (100). The processor (106) is further arranged for associating the current location with a current light setting if the first similarity criterion is not met, and the processor (106) is further arranged for storing the association in the memory (108).

15 Claims, 6 Drawing Sheets (58) Field of Classification Search
CPC ............... H05B 41/28; H05B 33/0803; H05B 33/0827; H05B 33/0809; H05B 33/0821; F21Y 2101/02
See application file for complete search history.

(56) References Cited

U.S. PATENT DOCUMENTS

| | | | |
|---|---|---|---|
| 7,884,556 | B2 | 2/2011 | Gandhi |
| 8,841,859 | B2 | 9/2014 | Chemel et al. |
| 2005/0179404 | A1* | 8/2005 | Veskovic ............ H05B 37/0254 |
| | | | 315/291 |
| 2009/0105856 | A1 | 4/2009 | Kurt et al. |
| 2013/0041518 | A1 | 2/2013 | Valetutti |
| 2014/0091731 | A1 | 4/2014 | Fushimi |
| 2015/0189724 | A1* | 7/2015 | Karc ................ H05B 37/0272 |
| | | | 315/149 |

FOREIGN PATENT DOCUMENTS

| | | |
|---|---|---|
| WO | 2006038135 A1 | 4/2006 |
| WO | 2008139360 A1 | 11/2008 |
| WO | 2009144652 A2 | 12/2009 |
| WO | 2012146256 A2 | 11/2012 |

* cited by examiner

Fig. 6

LIGHTING DEVICE WITH CONTEXT BASED LIGHT OUTPUT

CROSS-REFERENCE TO PRIOR APPLICATIONS

This application is the U.S. National Phase application under 35 U.S.C. § 371 of International Application No. PCT/EP2016/065998, filed on Jul. 6, 2016, which claims the benefit of European Patent Application No. 15179386.6, filed on Jul. 31, 2015. These applications are hereby incorporated by reference herein.

FIELD OF THE INVENTION

The invention relates to a lighting device for rendering a light output. The invention also relates to a method of controlling a light output of a lighting device. The invention further relates to a computer program product for performing the method.

BACKGROUND

Future and current home and professional environments may contain smart lighting devices for creation of ambient, atmosphere, accent or task lighting. Many of these devices are currently responsive to sensor input. These lighting devices may respond to for example changes in weather, temperature, device orientation, occupation, etc., which response can be based on sensory inputs from a wide variety of sensors. An example of a lighting device that is controlled based on sensory input is disclosed in patent application WO2006038135A1, wherein the light emission of a lighting device is based data received from an accelerometer comprised in the portable lighting device.

SUMMARY OF THE INVENTION

It is an object of the present invention to provide a lighting device which adjusts its light output according to its context.

According to a first aspect of the present invention, the object is achieved by a lighting device arranged for rendering a light output, the lighting device comprising:
at least one light source arranged for emitting light,
a receiver arranged for receiving at least one signal from at least one further device, which at least one signal is representative of a current location of the lighting device,
a processor arranged for controlling the light output of the at least one light source,
wherein the processor is further arranged for:
a. determining the current location of the lighting device based on the received at least one signal,
b. accessing a memory storing associations between locations and light settings,
c. comparing the current location to at least one stored location so as to determine whether a first similarity criterion is met, and
d. controlling, if the first similarity criterion is met, the light output of the lighting device according to a light setting associated with the stored location, wherein the processor is further arranged for associating the current location with a current light setting if the first similarity criterion is not met, and the processor is further arranged for storing the association in the memory.

By comparing the current location to a stored location, the processor of the lighting device controls the light output according to the light setting associated with the stored location. This means that when a lighting device has a light setting stored for a specific location, that light setting is applied when the lighting device is moved to that location. This is advantageous, because it allows a user to move the lighting device between locations, and for each location the previously set light setting will be applied to the lighting device. This is especially beneficial if the lighting device is a portable, wearable or easily moveable lighting device. The processor compares the current location to at least one stored location so as to determine whether a first similarity criterion is met. This similarity criterion may be, for example, a (threshold) value describing the range wherein the current location is similar to the stored location and/or it may be a value indicating a level of similarity between the stored location and the current location.

The processor is further arranged for associating the current location with a current light setting if the first similarity criterion is not met, and the processor is further arranged for storing the association in the memory. This provides the advantage that it allows the processor to store a light setting if the first similarity criterion is not met, which light setting may be, for example, defined by a user. The processor of the lighting device may, for example, determine that the first similarity criterion is not met and therefore not automatically apply a light setting to the lighting device. A user may then, for example, adjust the light output to a specific light setting, whereafter the processor associates the current location with the specific user setting and stores this association.

In an embodiment of the lighting device, the processor is further arranged for storing the association in the memory when the lighting device has been turned off or repositioned. The processor may be further arranged for detecting the repositioning of the lighting device when a new location is detected. Storing the association when the lighting device is repositioned is beneficial, because it allows a user to move the lighting device to the previous position, whereupon the processor will apply the (previously) stored light setting. Storing the association when the lighting device has been turned off (for example upon receiving a user input indicative of turning the lighting device off) is beneficial, because it allows a user to turn the device on at the same location, whereupon the processor will apply the (previously) stored light setting. Another benefit of this embodiment is that the user is no longer required to provide a user input indicative of a 'storing' command, because the association is stored automatically. These embodiments are further advantageous, because when the lighting device is turned on and/or repositioned to the original location, a user does not have to provide select a light setting for the lighting device, because the light setting will be applied automatically according to the light setting associated with that location.

In an embodiment of the lighting device, the processor is further arranged for controlling, if the first similarity criterion not is met, the light output of the lighting device according to the light setting of at least one of the group comprising a predefined light setting and a previous light setting. The predefined light setting may be a default system light setting, a predefined system light setting, a predefined user setting, etc. The previous setting may be the light setting of the lighting device before the processor has detected the (new) location. A user may, for example, move the lighting device from a first location associated with a first light setting to a second location not associated with a light setting. Upon detecting the second location, the processor may adjust the light output of the lighting device to the predefined light setting or the previous light setting.

In an embodiment of the lighting device, the receiver is arranged for detecting at least one coded light signal emitted by the at least one further device as the at least one signal. This at least one coded light signal may comprise location/position information about the further device, thereby providing the lighting device an indication of an absolute location in the space wherein the lighting device and the at least one further device are located. Alternatively, the coded light signal may be representative of an identifier of the further device, allowing the processor of the lighting device to determine its location based on an identification of the further device. This results in that the presence of the further device is indicative of the position/location of the lighting device (upon receiving a coded light signal emitted by another further device, the processor may determine that the lighting device is located at a different position/location). The processor may be further arranged for determining the distance between the further device and the lighting device based on a characteristic of the received at least one coded light signal (e.g. based on the light intensity, signal/noise ratio, etc.).

In an embodiment of the lighting device, the receiver is arranged for receiving at least one radio frequency signal from the at least one further device as the at least one signal. This at least one radio frequency signal may comprise location/position information about the further device, thereby providing the lighting device an indication of an absolute location in the space wherein the lighting device is located. Alternatively, the radio frequency signal may be representative of an identifier of the further device, allowing the processor of the lighting device to determine its location based on an identification of the further device. This results in that the presence of the further device is indicative of the position/location of the lighting device (upon receiving a radio frequency signal emitted by another further device, the processor may determine that the lighting device is located at a different position/location). The processor may be further arranged for determining the distance between the further device and the lighting device based on a characteristic of the received at least one radio frequency signal (e.g. based on the received signal strength, signal time of flight, etc.).

In an embodiment of the lighting device, the at least one signal comprises information about a space wherein the lighting device is located, and the processor is arranged for determining in which space the lighting device is located based on the information about the space. The information may, for example, be descriptive of the room wherein the lighting device is located (e.g. 'kitchen', 'office', 'living room', etc.). This may be advantageous if the space information is sufficient to determine the light setting.

In another embodiment of the lighting device, the at least one signal is indicative of a distance between the lighting device and the at least one further device, and the processor is arranged for determining the location of the lighting device relative to the at least one further device based on the distance between the lighting device and the at least one further device. This may be advantageous when a more exact location of the lighting device is required to set the light setting, for example when it is desired that the processor can distinguish between a location of floor level and a location at ceiling level, or distinguish between two corners in a room.

In an embodiment of the lighting device, the processor is arranged for comparing the current location to the at least one stored location at an event when the lighting device is powered on. This may be beneficial because the lighting device may only adjust its light output at the event when it is powered on, and the lighting device does not continuously adjust based on its received signals. Comparing the current location to the at least one stored location at the event when the lighting device is powered on, and for example not every predetermined time period, may further reduce computing by the processor.

In an embodiment of the lighting device, the lighting device further comprises a user interface arranged for receiving a user input, and the memory is further arranged for storing associations between locations and user interface settings, and the processor is further arranged for applying, if the first similarity criterion is met, a stored user interface setting associated with the stored location to the user interface. This embodiment provides the advantage that it allows a user to select a light setting from a plurality of light settings that are presented via the user interface. The presented light settings are associated with the detected location, which automatic presentation may result in a decrease of the time required for selecting/setting the light output of the lighting device, thereby improving the usability of the lighting device.

In an embodiment of the lighting device, the lighting device further comprises a detector arranged for detecting a current contextual characteristic, the contextual characteristic being at least one of the group: orientation of the lighting device (100), temperature, humidity, occupancy, weather conditions, air quality, time of day, surrounding light level, distance of the lighting device 100 from walls, ceiling and/or floor, and the processor is further arranged for:

a. accessing a memory storing associations between locations, contextual characteristics and light settings, b. comparing the current contextual characteristic to at least one stored contextual characteristic so as to determine whether a second similarity criterion is met, and c. controlling, if the first and the second similarity criterion are met, the light output of the lighting device according to a light setting associated with both the stored contextual characteristic and the stored location.

This embodiment allows the lighting device to retrieve a light setting not only based on the location of the lighting device, but also on a contextual characteristic of the lighting device. This provides the advantage that the processor uses at least one other parameter to determine the light output of the lighting device. This at least one parameter may be, for example, the orientation of the lighting device. Adjusting the light output of the lighting device based on an associated orientation may be especially beneficial if the lighting device is a portable, wearable or easily moveable lighting device. Additionally or alternatively, the detector is further arranged for detecting an environmental characteristic as the contextual characteristic, which environmental characteristic is defined by external factors that influence the environment surrounding the lighting device. The detector may, for example, be able to detect temperature, humidity, occupancy, weather conditions, air quality, etc., which values are compared with stored values representative of these parameters. This may be advantageous because it allows the processor to store and retrieve light settings based on detailed context information, and it may further be beneficial if the lighting device is a portable, wearable or easily moveable lighting device, because it is likely that such a device is used in different contexts.

In an embodiment of the lighting device, the processor is arranged for comparing the current contextual characteristic to at least one stored contextual characteristic and the current location to the at least one stored location when the lighting device is powered on.

In an embodiment of the lighting device, the processor is arranged for comparing the current contextual characteristic to at least one stored contextual characteristic and the current location to the at least one stored location when a user input has been received.

According to a second aspect of the present invention, the object is achieved by a method of controlling a light output of a lighting device, the method comprising the steps of:

receiving at least one signal from at least one further device, which at least one signal is representative of a current location of the lighting device, determining the current location of the lighting device based on the received at least one signal, accessing a memory storing associations between locations and light settings, comparing the current location to at least one stored location so as to determine whether a first similarity criterion is met, and controlling, if the first similarity criterion is met, the light output of the lighting device according to a light setting associated with the stored location, wherein the method further comprises the steps of:

associating the current location with a current light setting if the first similarity criterion is not met, and storing the association in the memory.

In further embodiments of the method, the step of storing the association in the memory is executed when the lighting device is repositioned or turned off.

According to a third aspect of the present invention, the object is achieved by a computer program product for a computing device, the computer program product comprising computer program code to perform the any one of the above-mentioned methods when the computer program product is run on a processing unit of the computing device.

BRIEF DESCRIPTION OF THE DRAWINGS

The above, as well as additional objects, features and advantages of the disclosed lighting devices and methods, will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
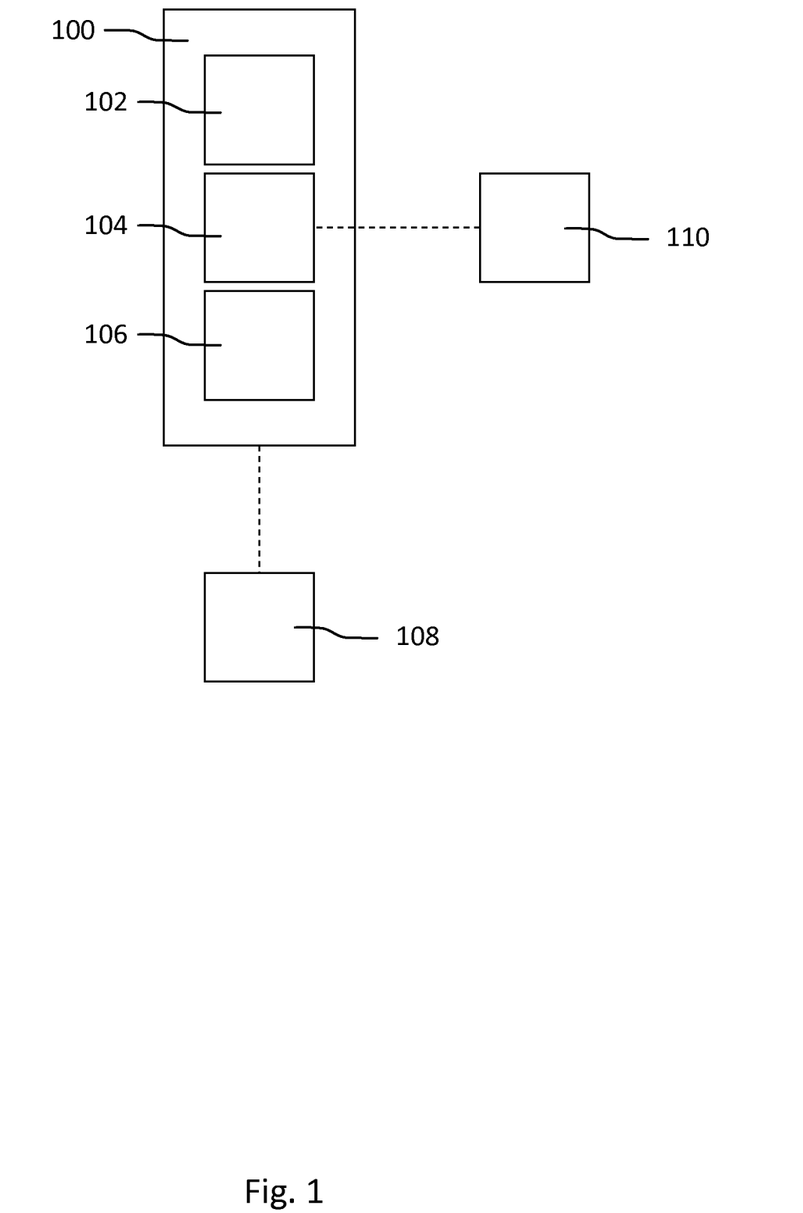
FIG. 1 shows schematically an embodiment of a lighting device according to the invention.

FIG. 1 shows schematically an embodiment of a lighting device 100 according to the invention. The lighting device 100 is arranged for rendering a light output. The lighting device 100 comprises at least one light source 102 (e.g. an LED light source, an OLED light source, an incandescent light source, a fluorescent light source, etc.) arranged for emitting light. The lighting device 100 further comprises a receiver 104 arranged for receiving at least one signal from at least one further device 110, which at least one signal is representative of a current location of the lighting device 100. The lighting device 100 further comprises a processor 106 (e.g. a micro controller, a microchip, circuitry, etc.) arranged for controlling the light output of the at least one light source 102. The processor 106 may be arranged for adjusting the hue, saturation, brightness and/or intensity of the light output of the at least one light source 102. The processor 106 is further arranged for determining the current location of the lighting device 100 based on the received at least one signal and for accessing a memory 108 storing associations between locations and light settings. The memory 108 may be located in the lighting device 100, an external device (e.g. in a home/office automation system) or in a remote device (such as a remote server accessible via a network or via the Internet). Upon accessing the memory 108, the processor 106 compares the current location to at least one stored location so as to determine whether a first similarity criterion is met. If the first similarity criterion is met, the processor 106 controls the light output of the lighting device 100 according to a light setting associated with the stored location.

The lighting device 100 may be any type of lighting device 100 arranged for emitting light. The lighting device 100 may comprise an LED light source, an OLED light source, an incandescent light source, a fluorescent light source, etc. The lighting device 100 may be arranged for providing general lighting, task lighting, ambient lighting, atmosphere lighting, accent lighting, informative lighting, etc. The lighting device 100 may be installed in a luminaire or in a lighting fixture. Alternatively, the lighting device 100 may be a portable lighting device 100 (e.g. a hand-sized device, such as an LED cube, an LED sphere, an object/animal shaped lighting device, a Philips Hue Go lamp, etc.) or a wearable lighting device 100 (e.g. a light bracelet, a light necklace, luminous clothing, etc.).

The receiver 104 of the lighting device 100 is arranged for receiving at least one signal from at least one further device 110, which at least one signal is representative of a current location of the lighting device. The further device 110 may be any type of device arranged for providing the signal to the lighting device 100. The further device 110 may, for example, be a beacon device emitting a wireless signal (e.g. radio frequency (RF), Bluetooth, ZigBee, WiFi, 3G, 4G, etc.). Alternatively, the further device 110 may be a lamp arranged for emitting light, which light emission comprises a distinguishable characteristic (e.g. a specific spectrum, a light modulation pattern, etc.), allowing the processor 106 of the lighting device 100 to identify the further device 110. Alternatively, the further device 110 may be arranged for emitting light comprising an embedded code, which embedded code comprises data. This data may be representative of the location of the lamp (and therewith the location of the lighting device). Alternatively, the receiver 104 of the lighting device 100 may be arranged for receiving signals via a wired interface (e.g. via DALI, DMX, Power over Ethernet, Power-line communication, etc.).

The signal may comprise information about the location of the lighting device, allowing the processing unit to determine the location based on the location information comprised in the signal. The signal may, for example, comprise descriptive information about the space/room (e.g. 'bathroom', 'hallway', kitchen', etc.) wherein the lighting device 100 is located. The signal may also comprise coordinates of the location of the lighting device 100. This allows the processor 106 of the lighting device 100 to compare current coordinates to stored coordinates in order to control the light output of the lighting device 100 if the first similarity criterion is met.

Figure 2:
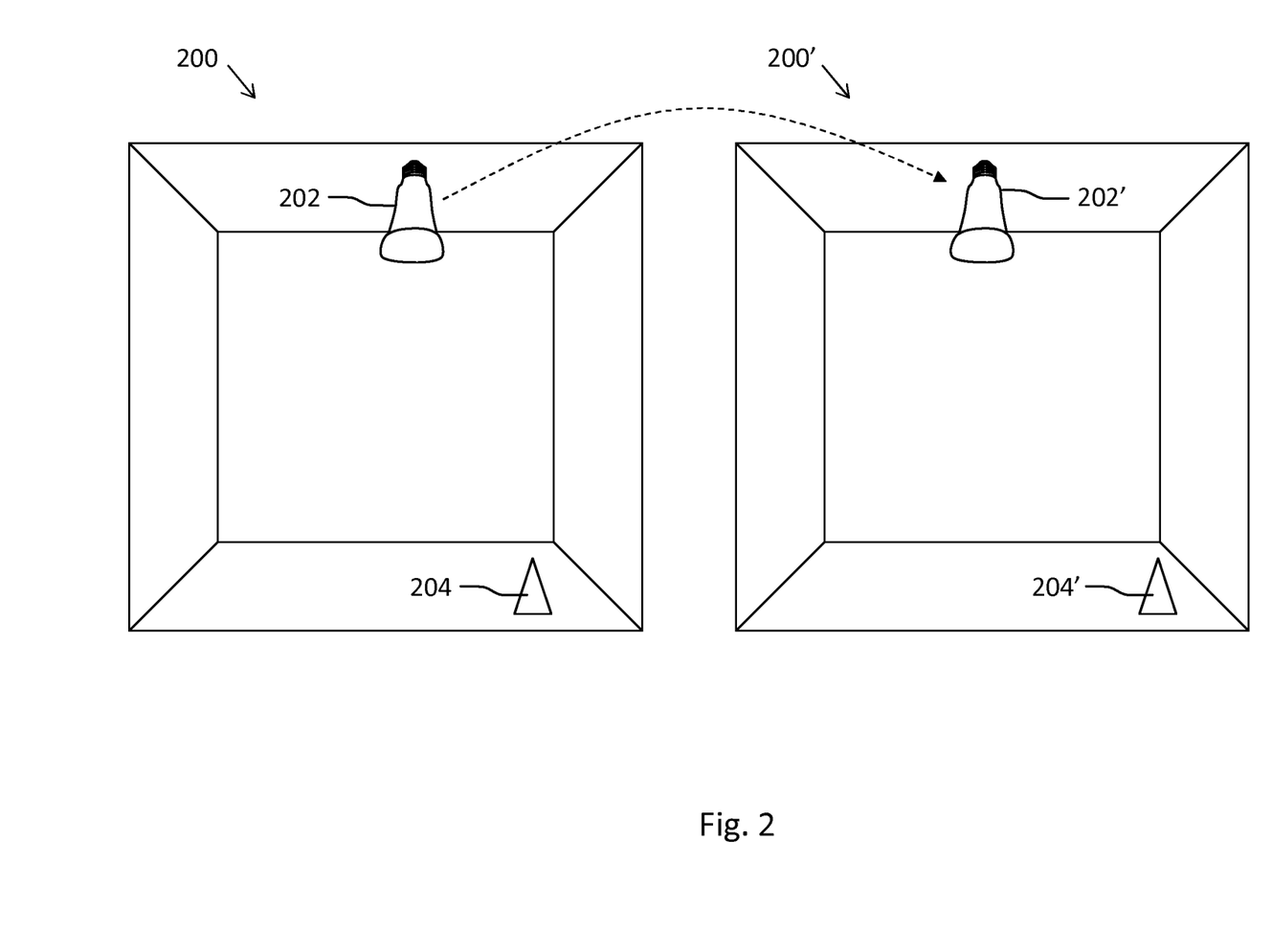
FIG. 2 shows schematically an embodiment of two rooms, each room comprising a lighting device according to the invention and a further device providing a signal representative of a current location.

FIG. 2 illustrates an example of a lighting device 202, 202' in a space 200, 200' that receives a signal comprising information about the space wherein the lighting device is located. The lighting device 202 may receive a first signal from a first further device 204 (e.g. an RF beacon, a home/office automation system, a smart device such as a smartphone, etc.) in a first space 200 (in this example a bathroom), the first signal comprising information about the location 200 (i.e. the bathroom). A user may move the lighting device 202 (e.g. a Philips Hue lamp) to a second space 200' (in this example a bedroom), whereupon the lighting device 202' may receive a second signal from a second further device 204' comprising information about the location 200' (i.e. the bedroom) of the lighting device 202'. Upon detecting the different location, the processor (not shown) accesses the memory (not shown) in order to compare the current location (bedroom) to stored locations to determine if the first similarity criterion is met. The memory may have a light setting associated with the bedroom stored, allowing the processor to control the light output of the lighting device 202' according to the stored light setting.

Alternatively, the signal does not comprise information about the location of the lighting device 100, but the processor 106 of the lighting device 100 is arranged for determining (calculating) the current location of the lighting device 100 based on the signal. In a first example, the processor 106 of the lighting device 100 may be arranged for determining its current location relative one further device 110. The processor 100 may receive a signal from the one further device 110, allowing the processor 106 to compare the signal with earlier received signals in order to determine if the received signal has been received before, thereby determining if the current location has sufficient similarities with the stored location, and to control the light output based on the stored light setting associated with the stored location. In another example, the processor 106 may be arranged for determining its current location relative to a plurality of further devices 110. The processor 106 may receive a plurality of signals from the plurality of further devices 110 and determine, based on the signals, if the combination of these signals from the further devices 106 has been received before, thereby determining if the current location has sufficient similarities with the stored location.

Figure 3:
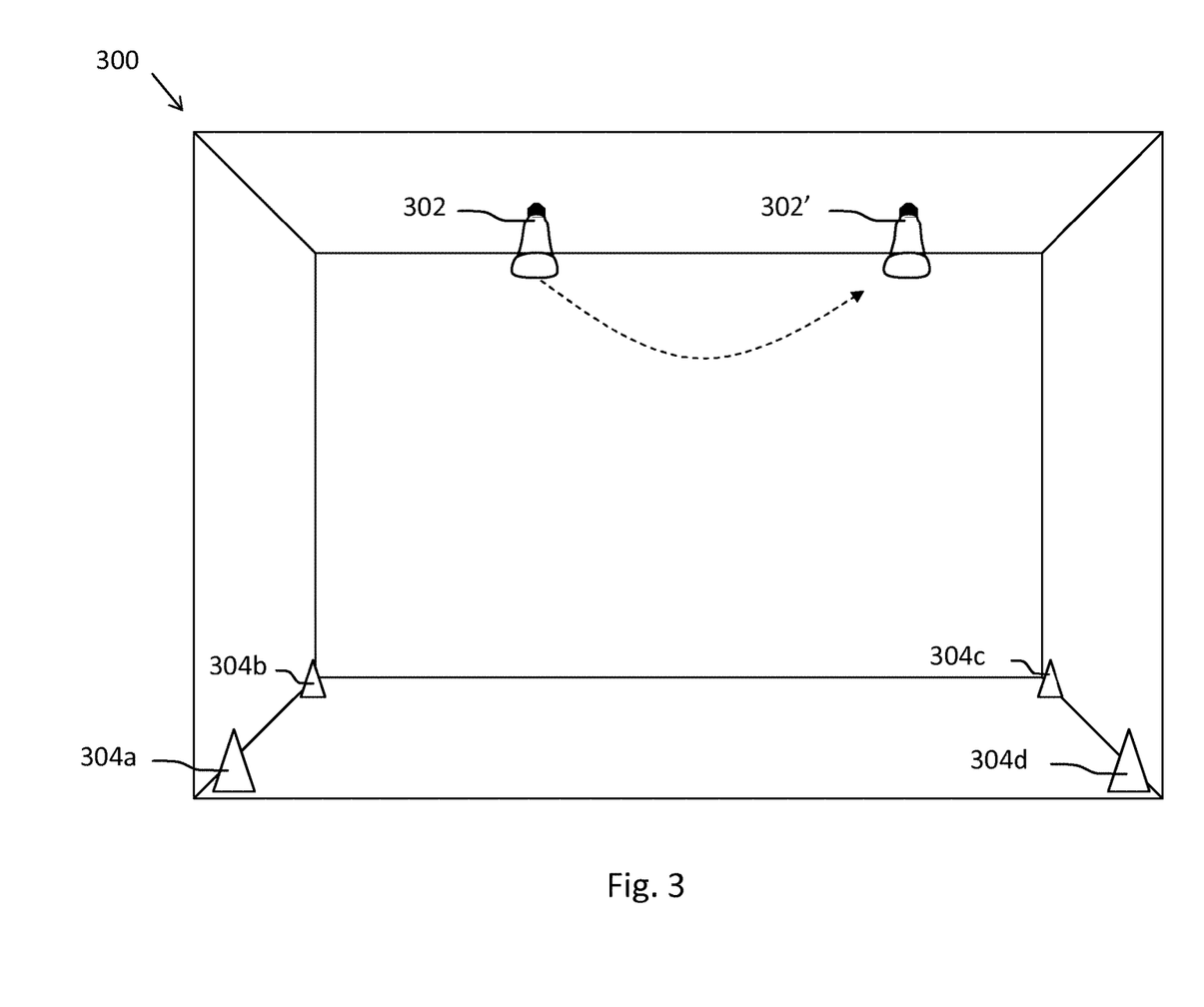
FIG. 3 shows schematically embodiments of a room comprising a lighting device according to the invention and a plurality of further devices providing signals representative of a current location of the lighting device.

FIG. 3 illustrates an example of a lighting device 302, 302' in a space 300 that receives a plurality of signals representative of a current location of the lighting device 302, 302' from a plurality of further devices 304a, 304b, 304c, 304d. In this example, the processor (not shown) is arranged for determining the location of the lighting device 302, 302' relative to the space wherein the lighting device 302, 302' and the further devices 304a, 304b, 304c, 304d are located. In this example, the receiver receives the signals from a plurality of radio frequency (RF) beacons 304a, 304b, 304c, 304d distributed throughout the space that may communicate with the lighting device 302, 302'. The processor may use triangulation or trilateration to calculate the position of the lighting device 302, 302' relative to the position of the beacons 304a, 304b, 304c, 304d based on for example the time-of-flight (TOF) of the RF signals received from the beacons 304a, 304b, 304c, 304d, or based on the received signal strength of the RF signals received from the beacons 304a, 304b, 304c, 304d. It should be noted that the beacon-based positioning system of FIG. 3 is just an example, and that a person skilled in the art is able to implement many alternative positioning systems such as a global positioning system, a coded light-based positioning system, etc. Alternative to the positioning system, the lighting device 302, 302' may comprise an altitude sensor (e.g. a (milli)barometric pressure sensor) to determine the height (Z-value) of the lighting device 302, 302'. The location of the lighting device 302, 302' may be defined by the X, Y and/or Z coordinates/values in the space. Upon detecting the location of the lighting device 302, 302', the processor may compare the current location (current X, Y and/or Z coordinates/values) to stored locations (stored X, Y and/or Z coordinates/values). The processor may adjust the light output of the at least one light source of the lighting device 302, 302' according to a stored light setting associated with a stored location. For example, the lighting device 302 may be located at a first position and, upon receiving a first set of XYZ values, the processor may adjust the light output according to a first light setting associated with the first set of values, while when the lighting device 302' is located at a second location with a second set of XYZ values, the processor may adjust the light output according to a second light setting associated with the second set of values.

The processor 106 may be further arranged for determining a characteristic of the one or more received signals. The characteristic may, for example, represent the received signal strength (RSS) of the one or more received signals, represent the time of flight of the one or more signals, etc. This may allow the processor 106 to create a signal signature of the one or more received signals, which signal signature is representative of a location. The processor 106 may be further arranged for comparing a current signal signature to a stored signature in order to determine if the first similarity criterion is met. If so, the processor 106 may control the light output of the lighting device 100 according to the light setting associated with the stored signal signature. This embodiment may further allow the lighting device 100 to determine its location relative to the at least one further device 110, without requiring the at least one further device 110 to actively transmit the signal to the lighting device 100, because the lighting device 100 may pick up passive signals (e.g. polling signals of wireless devices/wireless networks) in order to determine the signal signature. This may decrease the complexity of the overall system, and it allows the lighting device 100 to execute its functionality also in unknown (unpaired/unconnected) networks.

Figure 4:
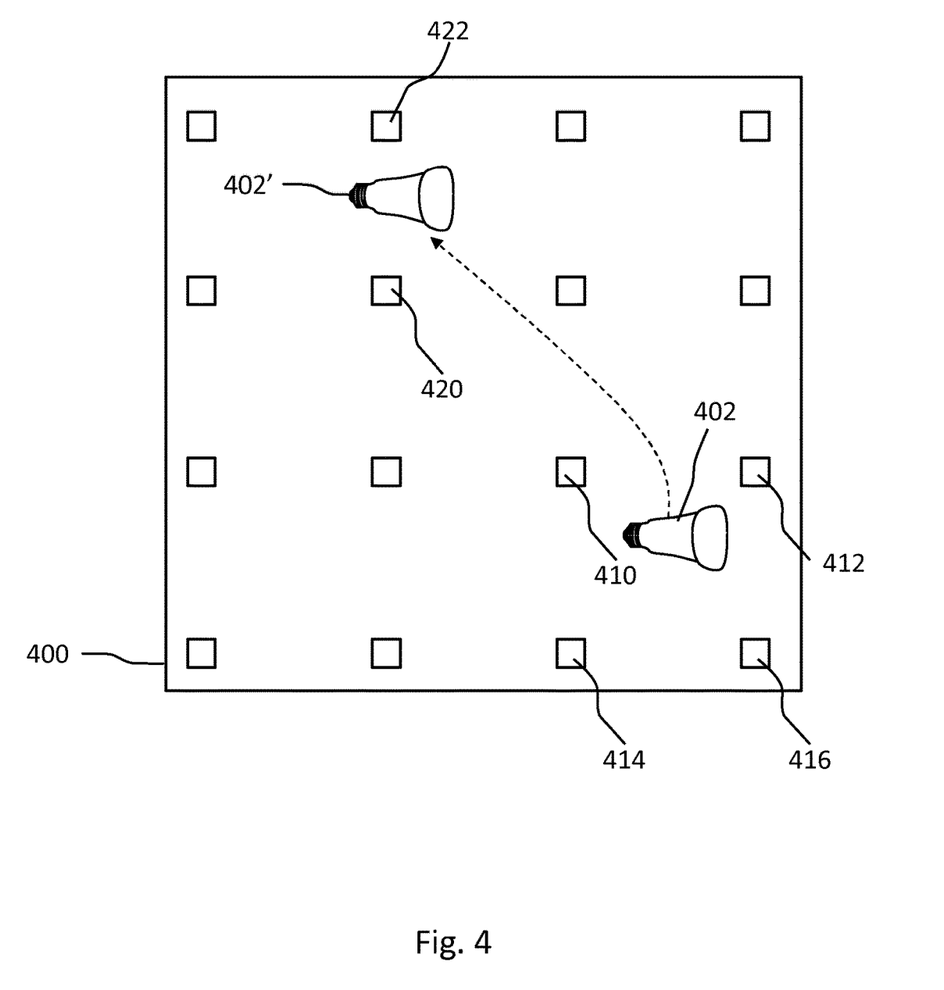
FIG. 4 shows schematically embodiments of a room comprising a plurality of further devices providing signals and a lighting device according to the invention which determines its current location based on the signal signature of received signals.

FIG. 4 illustrates an example of a lighting device 402, 402' in a space 400 that determines its location based on the signal signatures of the signals received from a plurality of further devices. These signals may be actively transmitted to the lighting device 402, 402', or they may be transmitted for other purposes (e.g. network polling). In the example of FIG. 4, the lighting device 402 (for example a portable lighting device) may be located at a first location where it receives signals from further devices 410, 412, 414, 416, whereupon the processor (not shown) determines the signal signature from these further devices 410, 412, 414, 416. The processor may compare this signal signature with stored signal signatures in order to determine if a light setting is associated with the current signal signature (and therefore with the current location). Upon moving the lighting device 402 to a second location, where the lighting device 402' receives signals from further devices 420 and 422, which results in a different signal signature. Upon detecting this different signature, the processor may access the memory (not shown) in order to determine if a light setting is associated with the second signal signature (and therefore with the second location). If this is the case, the processor controls the light output of the lighting device 402' according to the light setting associated with the second signal signature from further devices 420, 422 (and therefore with the stored location).

It should be noted that the above-mentioned location determination techniques are examples of determining a location relative to one or more further devices, and that a person skilled in the art is able to design many alternative location determination techniques without departing from the scope of the claims.

The processor 106 is arranged for controlling the light output of the lighting device 100 according to a light setting associated with the stored location if the first similarity criterion is met. This similarity criterion may be, for example, a (threshold) value describing the range (e.g. an absolute value, a percentage, etc.) wherein the current location is similar to the stored location. A location may, for example, be expressed in three values from 0 to 100, each value corresponding to an axis (X, Y and Z, see FIG. 5). The similarity criterion may describe that the value may deviate 5 from the stored value. Table 1 shows an example of a look-up table comprising a plurality of stored locations, each location associated with a light setting (X, Y and Z describe the coordinates of the lighting device 100 and R,G,B and I describe the red, green, blue and light intensity values of the light setting). The receiver 104 of the lighting device 100 may, for example, receive a signal representative of location (32, 51, 0). This results in that the first location of Table 1 meets the similarity criterion of a deviation value of 5, and therefore the processor 106 may control the light output of the lighting device 100 according to the first light setting (255,0,0,34) of Table 1 (R,G,B and I describe the red, green, blue and light intensity values of the light setting on a scale from 0-255).

TABLE 1

| | Location | Light setting |
|---|---|---|
| 1 | (X, Y, Z) = (34, 55, 0) | (R, G, B, I) = (255, 0, 0, 34) |
| 2 | (X, Y, Z) = (24, 50, 100) | (R, G, B, I) = (127, 86, 214, 62) |
| 3 | (X, Y, Z) = (50, 33, 50) | (R, G, B, I) = (255, 255, 255, 255) |
| 4 | (X, Y, Z) = (37, 60, 0) | (R, G, B, I) = (255, 32, 175, 34) |
| 5 | (X, Y, Z) = (90, 45, 100) | (R, G, B, I) = (27, 180, 120, 46) |

It should be noted that the deviation value is just an example of a similarity criterion, and that a person skilled in the art will be able to design many alternative types of similarity criterion without departing from the scope of claims of the present invention.

In the above-mentioned examples of the lighting device 100, the processor 106 controls the light output of the lighting device 100 if the first similarity criterion is met. The processor 106 may be further arranged for associating a current light setting with the current location if the first similarity criterion is not met. For example, when the lighting device 100 is turned on for the first time, it is likely that no associations with the current location are present in the memory 108. In such a case, the light setting of the lighting device 100 may be determined by the user, whereafter the processor 106 may associate the user light setting with the lighting device's 100 current location. The processor 106 may further store the location in the memory 108. In another example, the lighting device 100 may be moved to a new location which has no related associations stored in the memory 108 (and therefore the first similarity criterion is not met). Upon detecting the unknown location, the processor 106 may 'wait' for a lighting adjustment by a user, or the processor 106 may adjust the light setting according to a predefined light setting (e.g. a user-defined or system-defined light setting) or according to a previous light setting (e.g. the light setting from the previous location).

The processor 106 may be further arranged for storing the association in the memory when the lighting device 100 has been turned off or repositioned. The processor 106 may be further arranged for detecting the repositioning of the lighting device when a new location is detected/received. Storing the association when the lighting device 100 is repositioned allows a user to move the lighting device 100 to a previous position, whereupon the processor 106 will apply the (previously) stored light setting. Storing the association when the lighting device 100 has been turned off (for example upon receiving a user input indicative of turning the lighting device 106 off) allows a user to turn the lighting device 100 on at the same location, whereupon the processor 106 will apply the (previously) stored light setting. When the lighting device 100 is turned on and/or repositioned to the original location, a user does not have to select a light setting for the lighting device 100, because the light setting will be applied automatically according to the light setting associated with that location.

The processor 106 is arranged for comparing the current location to at least one stored location so as to determine whether a first similarity criterion is met. The processor 106 may determine to perform the comparison each predetermined period of time (e.g. every second, every minute, every hour), which may be advantageous when the lighting device 100 is a portable, wearable or easily moveable lighting device. Additionally or alternatively, the processor 106 may determine to perform the comparison each time the lighting device 100 is powered on. This embodiment is may be especially advantageous when the lighting device 100 requires a power-on event when it is moved to another position. This may be further advantageous for battery operated lighting devices 100. Additionally or alternatively, the processor 106 may determine to perform the comparison upon receiving an input via a sensor. The lighting device 100 may further comprise one or more sensors for detecting changes in the environment (e.g. an occupancy sensor, a weather sensor, a temperature sensor, etc.). This sensor input indicative of a change of the environment may be a trigger for the processor 106 to compare the current location to the one or more stored locations. Additionally or alternatively, the processor 106 may determine to perform the comparison upon receiving a user input. The user input may be received directly via a user interface element (e.g. a touch screen, a switch, a touch sensitive surface, a gesture input element, etc.) of the lighting device 100 and/or the user input may be received via a user interface device (e.g. a smart phone, a smart watch, smart goggles, a pc, etc.) connected to the lighting device, for example via a (wireless) network.

The lighting device 100 may further comprise a user interface (not shown) arranged for receiving a user input. The user interface may comprise, for example, a touch-sensitive device and/or one or more buttons for receiving a touch input, an audio sensor for receiving an auditory user input, a motion sensor for receiving a motion user input, etc. The memory 108 may be further arranged for storing associations between locations and user interface settings, which user interface settings are related to one or more light settings that may, for example, be coupled to different user input elements of the user interface. The processor 106 may be further arranged for applying, if the first similarity criterion is met, a stored user interface setting associated with the stored location to the user interface. The lighting device 100 may, for example, comprise a touch screen arranged for displaying one or more icons. The processor 106 may, for example, have access to a user interface setting comprising a number of previously selected light settings associated with the current location and the processor 106 may associate each light setting with for example an icon on the touch screen if the first similarity criterion is met. This allows a user controlling the lighting device 100 to provide a touch input on one of these icons, whereafter the light output of the lighting device 100 is controlled according to the associated light setting.

Figure 5:
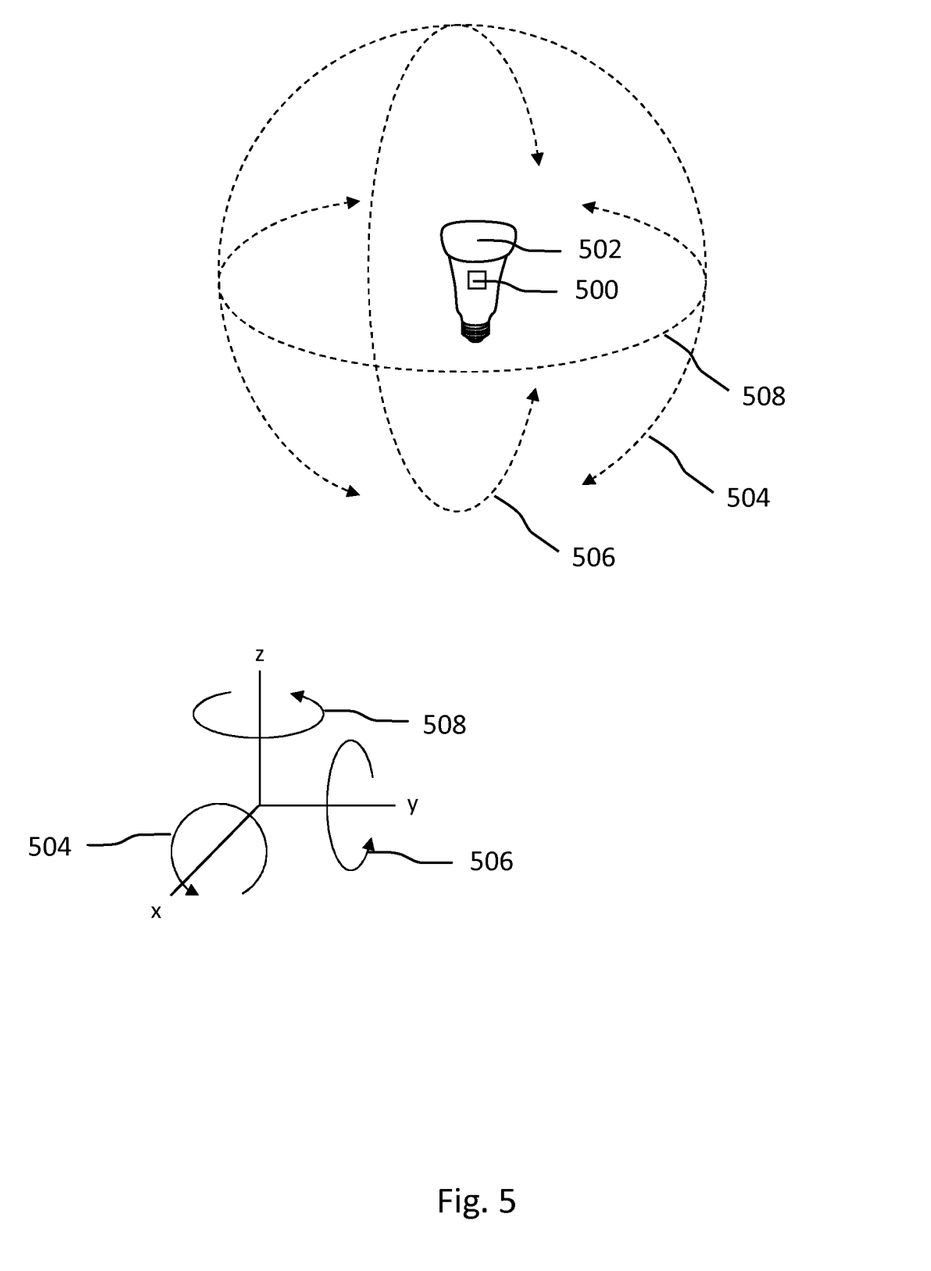
FIG. 5 shows schematically an embodiment of a lighting device according to the invention, wherein the lighting device is arranged for detecting its orientation as a contextual characteristic.
Figure 6:
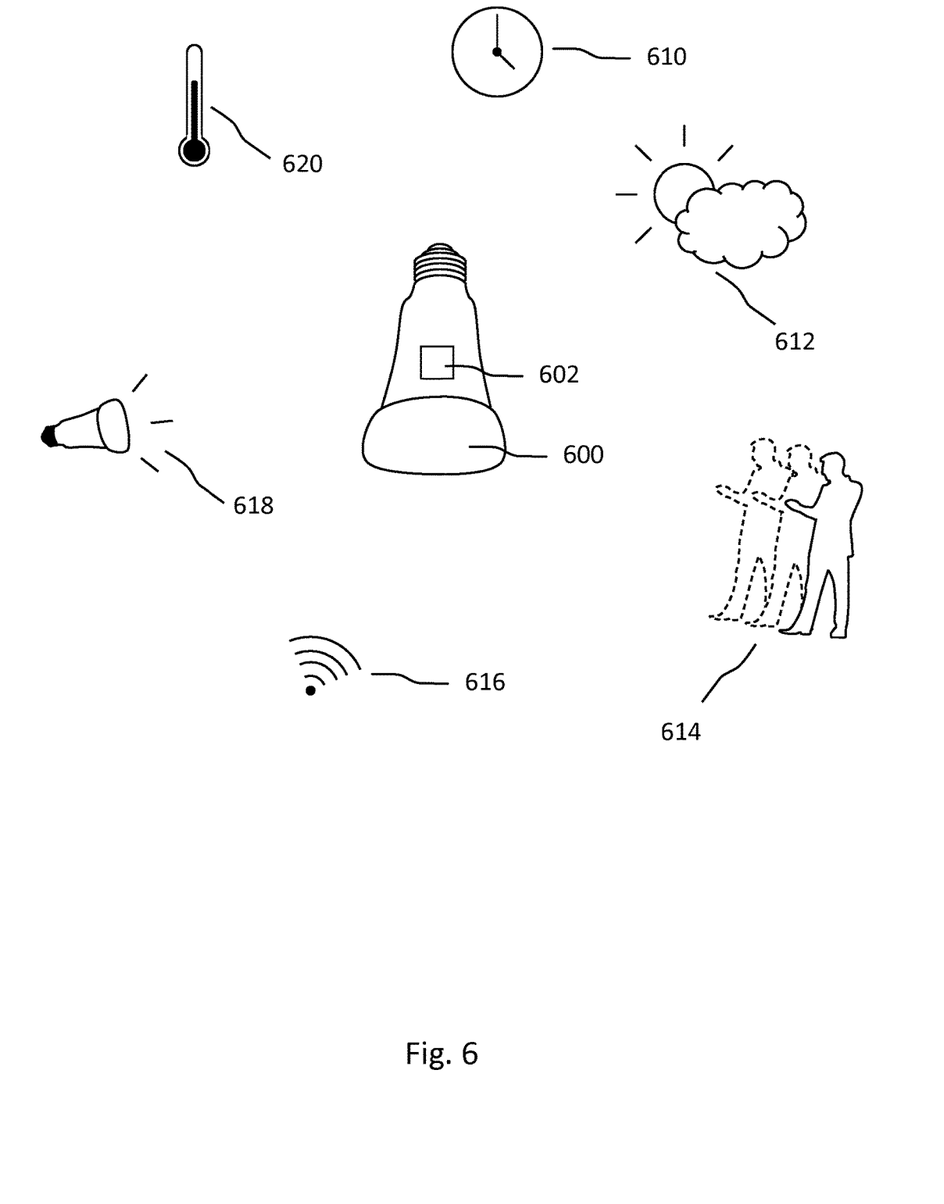
FIG. 6 shows schematically an embodiment of a lighting device according to the invention, wherein the lighting device is arranged for detecting one or more environmental characteristics.

The lighting device 100, 500, 600 may further comprise a detector 502, 602 arranged for detecting a current contextual characteristic of the lighting device 100, 500, 600. The current contextual characteristic is representative of how the lighting device 100, 500, 600 is placed in its environment and/or representative of a characteristic of the environment of the lighting device 100, 500, 600. The processor 106 may be further arranged for accessing a memory (which memory may be the same memory as the memory 108 storing associations between locations and light settings), which memory stores associations between locations, contextual characteristics and light settings. The processor 106 may be further arranged for comparing the current contextual characteristic to at least one stored contextual characteristic so as to determine whether a second similarity criterion is met, and for controlling, if the first and the second similarity criterion are met, the light output of the lighting device 100, 500, 600 according to a light setting associated with both the stored contextual characteristic and the stored location. This allows the processor 106 to control the light output of the lighting device 100, 500, 600 not only based on the location of the lighting device 100, 500, 600, but also on at least one contextual characteristic of the lighting device 100, 500, 600.

An example of a contextual characteristic is the orientation of the lighting device. FIG. 5 illustrates how the detector 502 may be arranged for detecting an orientation of the lighting device 500 as the contextual characteristic. The detector 502 may comprise one or more orientation sensors (such as one or more gyroscopes, one or more magnetometers, one or more tilt sensors, etc.) in order to determine the orientation of the lighting device 500. The orientation of the lighting device 502 may be defined by the roll, pitch and yaw of the lighting device around the X, Y and Z axes (504, 506 and 508 relatively). Alternatively, the orientation sensor may be able to determine a location of a gravity vector compared to a reference gravity vector in order to provide a value that represents the orientation. Upon detecting the orientation of the lighting device 500, the detector 502 may generate a signal in order to communicate the orientation to the processor (not shown). The processor may adjust the light output of the lighting device 500 if the current orientation and the current location show sufficient similarities (i.e. meet the first and second similarity criteria) with a stored orientation associated with a stored location. Table 2 illustrates an example of a look-up table which may be used by the processor to determine which light setting is associated with which location and orientation.

TABLE 2

| | Location | Orientation | Light setting |
|---|---|---|---|
| 1 | (X, Y, Z) = (34, 50, 100) | (X, Y, Z) = (0, 180, 0) | (R, G, B, I) = (255, 0, 0, 34) |
| 2 | (X, Y, Z) = (24, 90, 0) | (X, Y, Z) = (0, 0, 0) | (R, G, B, I) = (127, 86, 214, 62) |
| 3 | (X, Y, Z) = (50, 50, 50) | (X, Y, Z) = (45, 180, 45) | (R, G, B, I) = (255, 255, 255, 255) |
| 4 | (X, Y, Z) = (33, 60, 50) | (X, Y, Z) = (0, 90, 0) | (R, G, B, I) = (100, 200, 190, 168) |
| 5 | (X, Y, Z) = (33, 60, 50) | (X, Y, Z) = (0, 90, 180) | (R, G, B, I) = (27, 200, 200, 46) |

In an exemplary embodiment the processor 106 uses look-up Table 2 to determine which light setting is associated with which location and orientation. In this embodiment, the receiver 104 may receive a signal indicative of a location (33, 61, 51), indicating that the lighting device 500 is located at position (33,61) on the (X,Y) grid, and that the device is located at height 51 (Z value). In this example, the Z value describes a relative position of the device on a scale 0-100. This indicates that the lighting device 500 is located somewhere just above the vertical center of the room. Current location (33, 61, 51) has sufficient similarities with stored locations 4 (33, 60, 50) and 5 (33, 60, 50), because it meets the similarity criterion (in this example a 5% deviation range). In this example, the detector may detect an orientation (0, 88, 170) (which is representative of a 0° rotation around the X axis, a 88° rotation around the Y axis and a 170° rotation around the Z axis), and, based on the second similarity criterion (e.g. a 10% deviation range) determine that sufficient similarities with orientation 5 (0, 90, 180) are present. Because both the first and the second similarity criteria are met for light setting 5, the processor will control the light output of the lighting device according to light setting 5 (27,200,200,46) (R,G,B and I describe the red, green, blue and light intensity values of the light setting on a scale from 0-255).

Additionally or alternatively, the detector 602 may be arranged for detecting an environmental characteristic as the contextual characteristic, which environmental characteristic is defined by external factors that influence the environment surrounding the lighting device 600. FIG. 6 shows a plurality of examples of contextual characteristics 610, 612, 614, 616, 618, 620 may be detected by the detector. Examples of contextual characteristics are the surrounding light level 618, distance from walls/ceiling/floor, temperature 620, humidity, air quality, weather conditions 612, time of day 610, occupancy 614, signal signature 616, etc. The detector 602 may comprise one or more sensors to detect one or more environmental characteristics, the one or more sensors including but not limited to an occupancy sensor, a PIR sensor, an ambient light sensor, a temperature sensor, an RF receiver, a wireless signal receiver, a distance sensor and a humidity sensor.

TABLE 3

| Location | Temperature | Light setting |
|---|---|---|
| 1 (X, Y, Z) = (34, 50, 0) | 18° c. | (R, G, B, I) = (255, 0, 0, 34) |
| 2 (X, Y, Z) = (24, 90, 100) | 16° c. | (R, G, B, I) = (127, 86, 214, 62) |
| 3 (X, Y, Z) = (50, 50, 50) | 24° c. | (R, G, B, I) = (255, 255, 255, 255) |
| 4 (X, Y, Z) = (33, 60, 100) | 13° c. | (R, G, B, I) = (100, 200, 190, 168) |
| 5 (X, Y, Z) = (33, 60, 100) | 20° c. | (R, G, B, I) = (27, 80, 60, 46) |

In an exemplary embodiment the processor 106 may use look-up Table 3 to determine which light setting is associated with which location and temperature. In this embodiment, the receiver 104 may receive a signal indicative of a location (33, 62, 100), indicating that the device is located at position (33, 62) on the (X,Y) grid, and that the lighting device 600 is located at height 100 (Z value). In this example, the Z value describes a relative position of the device on a scale 0-100. This indicates that the lighting device is located at the ceiling. Current location (33, 62, 100) has sufficient similarities with stored locations 4 (33, 60, 100) and 5 (33, 60, 100), because it meets the similarity criterion (in this example a deviation value of 5). In this example, the detector 602 may detect a temperature of 19° c., and, based on the second similarity criterion (e.g. a 10% deviation range) determine that sufficient similarities with temperature 1 (18° c.) and temperature 5 (20° c.). Because both the first and the second similarity criteria are met for light setting 5, the processor will control the light output of the lighting device 600 according to light setting 5 (27,80, 60,46) (R,G,B and I describe the red, green, blue and light intensity values of the light setting on a scale from 0-255).

In the above-mentioned examples only one contextual characteristic is compared in order to determine according to which light setting the light output should be controlled. It may be advantageous if the lighting device 100, 500, 600 is arranged for detecting a plurality of contextual characteristics, for example temperature and orientation, because it may improve the accuracy of context detection and create a larger variety of combinations.

The processor 106 may be further arranged for associating the current contextual characteristic with a current light setting if the first and second similarity criteria are not met, and the processor 106 may be further arranged for storing the association in the memory. The processor 106 of the lighting device 100, 500, 600 may, for example, determine that the first and second similarity criteria are not met and therefore not apply a light setting to the lighting device 100, 500, 600. A user may then, for example, adjust the light output to a specific light setting, whereafter the processor 106 associates the current location and the current contextual characteristic with the specific user setting and stores this association.

The processor 106 may be further arranged for controlling, if the first and second similarity criteria are not met, the light output of the lighting device 100, 500, 600 according to the light setting of at least one of the group comprising a predefined light setting, and a previous light setting. The predefined light setting may be a default system light setting, a predefined system light setting, a predefined user setting, etc. The previous setting may be the light setting of the lighting device 100, 500, 600 before the processor 106 has detected the (new) location. A user may, for example, move the lighting device 100, 500, 600 from a first location associated with a first contextual characteristic and a first light setting to a second location not associated with a light setting. Upon detecting the second location and the second contextual characteristic, the processor 106 may adjust the light output of the lighting device 100, 500, 600 according to the predefined light setting or the previous light setting.

The processor 106 may determine to perform the comparison of the location and the contextual characteristic each predetermined period of time (e.g. every second, every minute, every hour), which may be advantageous when the lighting device 100, 500, 600 is a portable, wearable or easily moveable lighting device. Additionally or alternatively, the processor 106 may determine to perform the comparison of the location and the contextual characteristic at an event when the lighting device 100 is powered on. This embodiment is may be especially advantageous when the lighting device 100 requires a power-on event when it is moved to another position. This may be further advantageous for battery operated lighting devices 100. Additionally or alternatively, the processor 106 may determine to perform the comparison of the location and the contextual characteristic upon receiving an input from the detector 502, 602. This detector input indicative of a change of the environment may be a trigger for the processor 106 to compare the current location to the one or more stored locations. Additionally or alternatively, the processor 106 may determine to perform the comparison of the location and the contextual characteristic upon receiving a user input. The user input may be received directly via a user interface element (e.g. a touch screen, a switch, a touch sensitive surface, a gesture input element, etc.) of the lighting device 100 and/or the user input may be received via a user interface device (e.g. a smart phone, a smart watch, smart goggles, a pc, etc.) connected to the lighting device, for example via a (wireless) network.

In an embodiment of the lighting device 100, 500, 600, the memory is further arranged for storing associations between locations, contextual characteristics and user interface settings, and the processor 106 is further arranged for applying, if the first and second similarity criterion are met, a stored user interface setting associated with the stored location and the stored contextual characteristic to the user interface. This embodiment provides the advantage that it allows a user to select a light setting from a plurality of light settings that are presented via the user interface.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A lighting device arranged for rendering a light output, the lighting device comprising:
   at least one light source arranged for emitting light,
   a receiver arranged for receiving at least one signal from at least one further device, which at least one signal is representative of a current location of the lighting device,
   a processor arranged for controlling the light output of the at least one light source,
   wherein the processor is further arranged for:
   a. determining the current location of the lighting device based on the received at least one signal,
   b. accessing a memory storing associations between locations and light settings,
   c. comparing the current location to at least one stored location so as to determine whether a first similarity criterion is met, and
   d. if the first similarity criterion is met, then controlling the light output of the lighting device according to a light setting associated with the stored location, and if the first similarity criterion is not met, then the processor is further arranged for associating the current location with a current light setting and storing the association in the memory.

2. The lighting device of claim 1, wherein the processor is further arranged for storing the association in the memory when the lighting device has been turned off or repositioned.

3. The lighting device of claim 1, wherein the processor is further arranged for controlling, if the first similarity criterion not is met, the light output of the lighting device according to the light setting of at least one of the group comprising:
   a predefined light setting, and
   a previous light setting.

4. The lighting device of claim 1, wherein the receiver is arranged for detecting at least one coded light signal emitted by the at least one further device as the at least one signal.

5. The lighting device of claim 1, wherein the receiver is arranged for receiving at least one radio frequency signal from the at least one further device as the at least one signal.

6. The lighting device of claim 1, wherein the at least one signal comprises information about a space wherein the lighting device is located, and wherein the processor is arranged for determining in which space the lighting device is located based on the information about the space.

7. The lighting device of claim 1, wherein the at least one signal is indicative of a distance between the lighting device and the at least one further device, and wherein the processor is arranged for determining the location of the lighting device relative to the at least one further device based on the distance between the lighting device and the at least one further device.

8. The lighting device of claim 1, wherein the processor is arranged for comparing the current location to the at least one stored location at an event when the lighting device is powered on.

9. The lighting device of claim 1, wherein the lighting device further comprises a user interface arranged for receiving a user input, and wherein the memory is further arranged for storing associations between locations and user interface settings, and wherein the processor is further arranged for applying, if the first similarity criterion is met, a stored user interface setting associated with the stored location to the user interface.

10. A method of controlling a light output of a lighting device 1, the method comprising the steps of:
    receiving at least one signal from at least one further device, which at least one signal is representative of a current location of the lighting device,
    determining the current location of the lighting device based on the received at least one signal,
    accessing a memory storing associations between locations and light settings, comparing the current location to at least one stored location so as to determine whether a first similarity criterion is met, and
    if the first similarity criterion is met, controlling the light output of the lighting device according to a light setting associated with the stored location, and if the first similarity criterion is not met associating the current location with a current light setting, and storing the association in the memory.

11. The method of claim 10, wherein the step of storing the association in the memory is executed when the lighting device is repositioned or turned off.

12. A computer program product for a computing device, the computer program product comprising computer program code to perform the method of claim 10, when the computer program product is run on a processing unit of the computing device.

13. A lighting device arranged for rendering a light output, the lighting device comprising:
    at least one light source arranged for emitting light,
    a receiver arranged for receiving at least one signal from at least one further device, which at least one signal is representative of a current location of the lighting device,
    a processor arranged for controlling the light output of the at least one light source, and a detector arranged for detecting a current contextual characteristic, the contextual characteristic being at least one of the group orientation of the lighting device, temperature, humidity, occupancy, weather conditions, air quality, time of day, surrounding light level, distance of the lighting device from walls, ceiling and/or floor, and wherein the processor is arranged for:
    a. accessing a memory storing associations between locations, contextual characteristics and light settings, b. comparing the current contextual characteristic to at least one stored contextual characteristic so as to determine whether a second similarity criterion is met, and c. controlling, if the first and the second similarity criterion are met, the light output of the lighting device according to a light setting associated with both the stored contextual characteristic and the stored location.

14. The lighting device of claim 13, wherein the processor is arranged for comparing the current contextual characteristic to at least one stored contextual characteristic and the current location to the at least one stored location when the lighting device is powered on.

15. The lighting device of claim 13, wherein the processor is arranged for comparing the current contextual characteristic to at least one stored contextual characteristic and the current location to the at least one stored location when a user input has been received.

* * * * *